Figure 1:
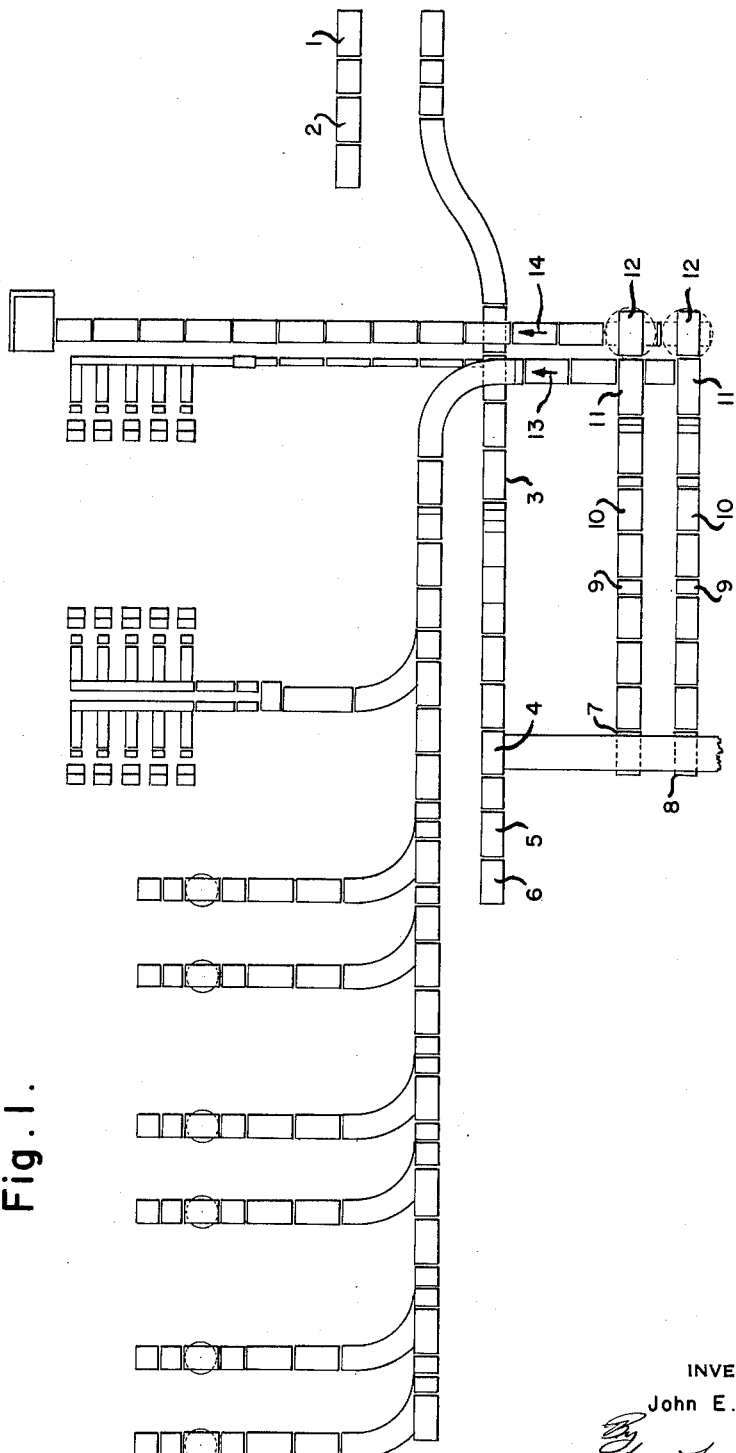

Dec. 21, 1965  J. E. HOUSER  3,224,565
METHOD AND APPARATUS FOR CONVEYING OBJECTS
Filed July 17, 1963  2 Sheets-Sheet 1

INVENTOR
John E. Houser
his attorneys

Dec. 21, 1965  J. E. HOUSER  3,224,565
METHOD AND APPARATUS FOR CONVEYING OBJECTS
Filed July 17, 1963  2 Sheets-Sheet 2

INVENTOR
John E. Houser

United States Patent Office 3,224,565
Patented Dec. 21, 1965

3,224,565
METHOD AND APPARATUS FOR CONVEYING OBJECTS
John E. Houser, Marion, Ohio, assignor to The Fairfield Engineering Company, Marion, Ohio, a corporation of Ohio
Filed July 17, 1963, Ser. No. 295,669
3 Claims. (Cl. 198—190)

This invention relates to the transporting of objects upon moving conveyors. It particularly relates to aligning and steering objects which are being conveyed while they are upon the conveyors.

The use of varying types of conveyors is old and well developed. Various well-known forms are customarily employed such as roller conveyors, belt conveyors and the like. In some cases the conveyors are inert and operate by force of gravity or inertia of objects which are being conveyed. In other cases live conveyors are used in which power is applied to the conveyors, either steadily or intermittently. It has long been known that the use of conventional conveyors ordinarily results in considerable misalignment of objects being carried upon them. It is commonplace, for example, to have side rails or guards which will keep the conveyed objects in desired position upon the conveyor deck. Where the objects being conveyed are relatively substantial, such an arrangement is of little concern. Ordinary packages and packing boxes, for example, can be readily handled in this fashion. When the objects being conveyed are fragile, however, then an entirely different situation prevails and it is of the utmost importance that they be accurately positioned and aligned upon the conveyor. While various schemes have been suggested, they have generally been subject to shortcomings in that they required attention by an operator or have risked damage to the objects on the conveyor.

I have invented new and useful improvements in conveying which avoid the foregoing disadvantages. I provide a plurality of belt members arranged in side-by-side relationship and driven at substantially uniform speed. I arrange the belts in such a manner that their upper reaches comprise the conveying surface. I further provide means whereby the tension upon each belt can be selectively adjusted thereby varying the effective speed of that belt from the speed of the other belts and varying its actual speed from its nominal speed. I preferably provide means for taking up slack existing in each of the belts whereby a desired tension is produced. I preferably provide a plurality of belt members arranged side-by-side relationship and having end pulley members, the end pulley members for each belt being aligned with the corresponding end pulley members of the remaining belts. I preferably provide gravity operated tension means associated with each of said belts. I further provide means to adjust the tension producing force whereby the precise speed of each of the belts may be individually adjusted and objects upon the conveyor may be steered thereby. I prefer to provide idler pulley means rotatably mounted on the end of crank means, and provide a weight slidable along a substantially horizontal arm of the crank whereby the idler pulley means is forced upwardly against the lower reach of the belt and tensions the belt.

Other details, objects and advantages of my invention will become more apparent as the following description of the present preferred embodiment thereof proceeds.

Figure 2:
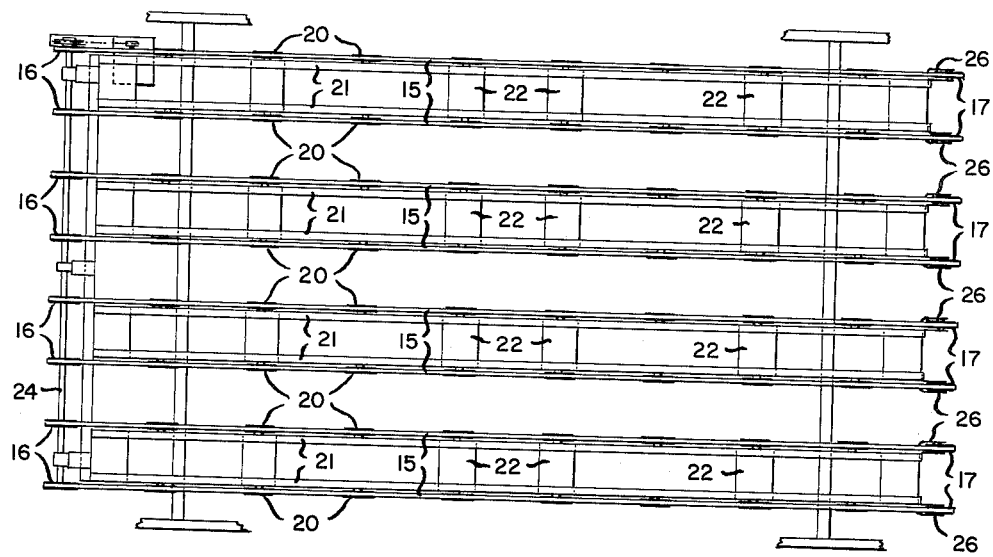

In the accompanying drawings I have illustrated a present preferred embodiment of my invention in which
FIGURE 1 is a plan view of a complete conveyor system which employs conveyors embodying the invention;
FIGURE 2 is a plan view of one of the conveyors of FIGURE 1 embodying the invention; and
FIGURE 3 is a side elevation of the conveyor shown in FIGURE 2.

FIGURE 1 illustrates a complete conveyor system in which the invention may be used advantageously. The system is designed for the inspection, cutting, storage and warehousing, and packing of sheet glass. Glass sheets from the furnaces are initially placed upon conveyor 1 or conveyor 2 by vacuum cup lifters which transfer the sheets from a lehr table or the like. The sheets are carried forward from conveyors 1 and 2 on a series of conveyors to a roller conveyor 3 where the sheets are inspected and then carried further along additional conveyors to a transfer cart 4. If the glass is to be stored in large sheets, it passes forward to one of conveyors 5 and 6 from which it is transferred to storage piles by vacuum cup lifters. If the glass is to be cut to size immediately, it is shifted by the transfer cart to one of conveyors 7 or 8. Glass on conveyor 7 is moved along a series of intermediate waiting conveyors to an edge trimmer 9. After the edges have been trimmed, the glass is advanced to a cutter 10 where it is cut to size. It then moves to transfer 11 or rotary transfer 12. The glass thereafter follows one of the conveyor paths 13 or 14 to any one of a large number of stations where it is immediately packed or is stored according to order requirements, inventories, and the like. A similar parallel path is provided from conveyor 8 to conveyor paths 13 and 14. Accordingly the glass which is to be sized may follow either of two parallel paths between transfer cart 4 and the conveyor paths 13 and 14.

At a large number of locations throughout the entire system precise positioning of the glass is of paramount importance. It is of high importance at conveyors 5 and 6, where the glass is picked up by vacuum cups and placed in a pile. Accurate registration of the glass is required to form a single pile and avoid damage to the glass. Accurate registration is likewise essential at edge trimmer 9 to ensure that a proper amount of glass is trimmed. Accurate registration is likewise required where the glass sheets are stored or packed. In addition, accurate registration is required throughout to avoid damaging of the edges or having an overhang which is likely to lead to breakage of the glass. The problem is accentuated by the numerous transfers and alternate handling positions.

Figure 3:
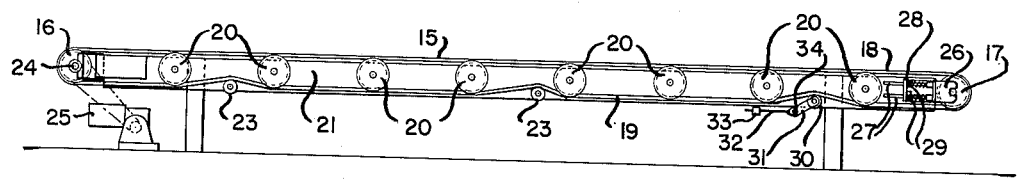

To steer the glass sheets and to obtain the desired registration, a large number of the conveyors are of the type shown in FIGURES 2 and 3. Each such conveyor comprises a plurality of side-by-side endless belts 15 which extend between driven end pulleys 16 and idler end pulleys 17. Each belt has an upper reach 18 upon which the glass sheets are carried and a lower reach 19 for the belt return. On both its upper and lower reaches each belt contacts and passes over intermediate idler pulleys 20 which are journalled upon a conveyor frame. The conveyor frame comprises a pair of longitudinal side members 21 and spaced transverse members 22 which hold the side members in the desired relationship. Idler pulleys 23 are spaced at intervals beneath the lower reach 19 of each belt and force it upward so that the belt is maintained in proximity to the frame without any drooping.

The driven end pulleys 16 are keyed onto a drive shaft 24 driven through a speed reducer and chain drive by an electric motor 25. Each idler end pulley 17 is journalled in a forked bracket 26 mounted on rods 27 which are slidably fixed in a channel shaped bracket 28 welded to the conveyor frame. Each rod is threaded to receive nuts 29 which hold forked bracket 26 as far out from the conveyor frame as desired. A tension idler pulley 30 presses upward against the lower reach of each belt. Pulley 30 is rotatably mounted on the end of a crank arm 31, the other arm of the crank 32 has a weight 33 slidably mounted on it. The crank is journalled at a pin 34 connected to the conveyor frame. Weight 33 is locked in desired position on arm 32 by a set screw.

When the system is in operation, a glass sheet of full size is placed upon one of conveyors 1 and 2. The sheet is then advanced upon successive conveyors to transfer cart 4. Some of the conveyors may be curved as shown in FIGURE 1. At transfer cart 4 the glass is sent directly to storage or is cut and forwarded along the various conveyor paths as set forth above. Many of the conveyors are of the type shown in FIGURES 2 and 3.

Each of the belts 15 is driven by a head pulley of like size with the other head pulleys on the same shaft. In theory, therefore, each belt should travel at the same speed. In fact the surface speed of each belt may vary from the surface speed of each other belt. The result is to cause skewing of a sheet of glass which is spread upon and across the belts of the conveyor. If, for example, a belt at one side is moving faster than the other belts of the conveyor, that belt will cause the same side of the sheet to move forward and skew the sheet on the conveyor. In some instances such a result is unwanted. In other cases, as where the conveyor is to make a bend, skewing may be helpful in achieving a proper orientation of the sheet.

Various factors cause a difference in speeds between the several belts, even though they may all be driven by identical pulleys. It will be apparent that as the belt travels around the pulley at each end, there will inevitably be some slippage between the belt and the pulley. The outer portion of the belt travels a greater distance than the inner portion since it is at a greater radius from the axis of the drive pulley. There will accordingly be a neutral axis whose speed can be ascertained and whose speed will be the true speed of the belt. Changing the tension of the belt changes the position of the neutral axis within the belt and therefore brings about small changes in the speed of the belt even though the drive pulley runs at a constant speed and the load is not changed. Variations in cross-section from one belt to another will likewise cause the belts to move at different speeds.

As each weight 33 is moved toward or away from pivot point 34, the tension upon the belt will change and its forward speed will likewise change. By appropriate adjustment of the weights, the belt tensions can be adjusted and objects being carried upon the conveyor can readily be steered so as to place them in the desired position at the discharge end of the conveyor. In this manner objects being carried upon the conveyors are readily steered to a precise and desired position.

In the event that a belt 15 stretches, weight 33 will drop so that arm 32 is not horizontal and the tension in the belt will be reduced. When that happens, nuts 29 are rotated to extend idler end pulley 17 until arm 32 is again horizontal. At that point the belt will again be under the desired end tension and will produce the desired orientation of objects which it carried.

I will be seen that by appropriate adjustment of the position of weights 33 and of the slack adjusting mechanism, one conveyor or a plurality of conveyors acting together, effectively direct objects being carried by the conveyors to any desired point thereby avoiding damage by the conveyors to the objects carried and permitting a more effective and efficient use of automatic handling equipment.

While I have illustrated and described a present preferred embodiment of my invention it is to be understood that I do not limit myself thereof and that my invention may be otherwise variously practiced within the scope of the following claims.

I claim:

1. The method of steering objects on a multiple belt conveyor which comprises providing a plurality of substantially parallel steerable, elastomeric belts, each extending between end pulleys and each having a drive pulley and an adjustably movable slack take-up pulley, yieldable tension means associated with each said belt and adjustable to maintain a desired tension on each belt, driving the drive pulleys at a common speed, adjusting the tension means associated with each belt to a desired setting for said belt and thereafter adjusting the slack take-up pulley for each belt from time to time whereby stretch in the belt is taken up and the tension on the belt is maintained constant.

2. The method of steering objects on a multiple belt conveyor which comprises providing a plurality of substantially parallel stretchable, elastomeric belts, each extending between end pulleys, each said belt passing over a drive pulley and an adjustably movable slack take-up pulley, a second slack take-up pulley associated with each belt, yieldable tension means associated with each second slack take-up pulley and adjustable to maintain a desired tension on each belt, driving the drive pulleys at a common speed, adjusting the tension means associated with each belt to a desired setting for said belt, and thereafter adjusting the slack take-up pulley for each belt from time to time whereby stretch in the belt is taken up and the tension on the belt is maintained constant.

3. The method of steering objects on a multiple belt conveyor which comprises providing a plurality of substantially parallel stretchable, elastomeric belts, each extending between end pulleys, each said belt passing over a drive pulley and an adjustably movable first slack take-up pulley, a second slack take-up pulley associated with each belt, tension means including a crank arm in operative connection with each second slack take-up pulley and a weight adjustably movable along the crank arm to maintain a desired tension on each belt, driving the drive pulleys at a common speed, adjusting the weight on the crank arm associated with each belt to tension said belt to a desired setting, and thereafter adjusting the first slack take-up pulley for each belt from time to time whereby stretch in the belt is taken up and the tension on the belt is maintained constant.

References Cited by the Examiner
UNITED STATES PATENTS

| | | | |
|---|---|---|---|
| 290,715 | 12/1883 | Steiner | 198—29 |
| 574,444 | 1/1897 | Nickerson | 198—208 X |
| 2,759,594 | 8/1956 | Kleboe | 198—190 |
| 2,781,892 | 2/1957 | Thevenieau | 198—208 X |
| 3,088,581 | 5/1963 | Rostal | 198—202 |

SAMUEL F. COLEMAN, *Primary Examiner.*

EDWARD A. SROKA, *Examiner.*